UNITED STATES PATENT OFFICE.

FREDERICK BECK, OF NEW YORK, N. Y.

COATING AND ORNAMENTING THE SURFACES OF PAPER, CLOTH, &c.

SPECIFICATION forming part of Reissued Letters Patent No. 9,473, dated November 23, 1880.

Original No. 109,416, dated November 22, 1870. Application for reissue filed October 29, 1880.

*To all whom it may concern:*

Be it known that I, FREDERICK BECK, a citizen of the United States, residing at the city, county, and State of New York, have invented a new and useful Improvement in Coating and Ornamenting the Surface of Paper, Cloth, and other Fabrics or Materials; and I do hereby declare that the following is a full, clear, and exact description thereof.

My invention is applicable to the coloring or ornamenting of paper, cloth, and other fabrics or materials for wall-hangings, coverings of fancy boxes, window-shades, and a great variety of useful and ornamental purposes; and it consists in the use of finely-reduced mica-scales, combined with transparent or translucent adhesive substances, applied to the surface of plain or ornamental fabrics or materials, by which means the mica-scales are uniformly and firmly attached to the fabrics or materials, and may then be printed upon, embossed, or ornamented in any suitable manner.

In carrying out my invention I take finely-reduced mica-scales which have been subjected to the action of heat and reduced in the manner described in the Letters Patent of the United States numbered 109,416, dated November 22, 1870, granted to me and Henry M. Johnson; or in any other suitable manner. The mica must have been subjected to the action of heat or acid, or of both heat and acid, in some suitable manner, as when thus prepared the mica-scales have a pearly-white opacity and silvery luster, possessing the property of reflecting light.

Mica-scales suitably prepared can be bought in the market under the names of "mica-brocade" or "mica-silver."

Care should be taken that the mica-scales be not too fine, as if reduced to dust their luster would be impaired. They should have perceptibly flat surfaces. A suitable size is such as would pass through a sieve of eighty to one hundred meshes to the inch. These mica-scales I combine with solutions of starch, glue, gum, or other suitable transparent or translucent adhesive substance or substances, to which I sometimes add glycerine for the purpose of imparting suppleness to the compound when dry. I then select any suitable paper, cloth, or other fabric or material, and I coat its surface with the compound by the use of brushes or other suitable means.

The compound of mica-scales and adhesive substances should be made of such a consistency as to admit of its flowing freely under the brush, and no more adhesive substance should be used in combination with the mica-scales than is required to bind them firmly to the fabric. A suitable compound for the purpose is made as follows: I take six pounds of starch and boil it thoroughly in ten gallons of water, to which I then add one pound of glue previously soaked and dissolved in one gallon of water. I then take fifty pounds of finely-reduced mica-scales and mix them with water, and then add them to the solution of starch and glue, after which I add ten pounds of glycerine, and, lastly, add water enough to make the compound measure forty-five gallons, and after a thorough mixing of the compound I then apply it to the fabrics in the manner described.

The compound may be applied upon a colored or shaded ground, and after drying the ground will show through the mica coating and a most beautiful and varied effect will be obtained.

By the use of my invention I am enabled to produce a surface-coating of mica-scales upon paper, cloth, and other fabrics or materials having a semblance to silk unattainable by any other means.

Having thus described my invention, what I claim as new, and desire to secure by Letters Patent, is—

1. The process herein described for ornamenting the surface of paper, cloth, wood, metals, and other materials, by coating them with suitably-prepared mica-scales, combined with transparent or translucent adhesive substances with or without the admixture of glycerine, substantially as set forth.

2. A fabric, such as paper, cloth, or the like, coated with suitably-prepared mica-scales, combined with transparent or translucent adhesive substance or substances, with or without the admixture of glycerine, substantially as described.

In testimony whereof I have hereunto set my hand in the presence of two witnesses.

FR. BECK.

Witnesses:
JAMES S. O'CALLAGHAN,
JAMES H. FAY,